Patented Oct. 24, 1944

2,360,867

UNITED STATES PATENT OFFICE 2,360,867

SOLVENTS FOR COPOLYMERS OF BUTADIENE HYDROCARBONS AND ALPHA METHYLENE NITRILES

Benjamin S. Garvey, Akron, Ohio, assignor to The B. F. Goodrich Company, New York, N. Y., a corporation of New York No Drawing. Application October 2, 1941, Serial No. 413,303

6 Claims. (Cl. 260—32)

This invention relates to a new class of solvents for synthetic rubber of the type prepared by the copolymerization of a butadiene-1,3 hydrocarbon and an alpha methylene nitrile, and to the improved liquid compositions comprising such synthetic rubber dissolved in such new solvents.

It is well known that synthetic rubber of the type prepared by the copolymerization of a butadiene hydrocarbon and an alpha methylene nitrile is relatively much less soluble in common rubber solvents than is natural rubber or other synthetic rubbers. Gasoline and other hydrocarbons, for examples, are excellent solvents for natural rubber but absolutely fail to dissolve this type of synthetic rubber. Although some solvents such as chlorinated hydrocarbons, esters and ketones to dissolve this type of synthetic rubber to a certain extent, they are not entirely satisfactory for use in the large scale production of cements, coating compositions and the like. Cements made by using esters and ketones as solvents generally gel quite easily and, accordingly, can not be extensively used. Ethylene dichloride is perhaps the best of the known solvents but it is quite toxic and its use in large quantities constitutes a serious industrial hazard.

I have now discovered that saturated aliphatic hydrocarbon derivatives which contain at least one nitro group and which are liquid under ordinary conditions are excellent solvents for copolymers of butadiene hydrocarbons and alpha methylene nitriles. These materials possess a very high solvent power for the copolymer; they yield cements which show no tendency to gel at ordinary temperatures even when the copolymer is used in fairly high concentrations; they are sufficiently volatile for most purposes and they are relatively non-toxic. Accordingly this invention comprises solutions of copolymers of butadiene hydrocarbons and alpha methylene nitriles in these new solvents. Such solutions may be used to make cements, paints, coating compounds and other liquid compositions for use in impregnating and coating articles of many different kinds.

Among the saturated aliphatic hydrocarbon derivatives containing at least one nitro group, which are employed as solvents in this invention, there may be mentioned the liquid nitroparaffins such as nitromethane, nitroethane, 1-nitropropane, 2-nitro-propane, 1-nitro-butane, 2-nitro-butane, 1-nitro-pentane, 3-nitro-pentane, 1-nitro-hexane, 4-nitro-heptane, 1-nitro-octane, 2-methyl-1-nitro-propane, 2-methyl-3-nitro-butane, 1,1-dinitro-ethane, 1,1-dinitro-butane, 1,2-dinitro-butane, 2-methyl-2,3-dinitro-butane and the like; the liquid halogen substituted nitroparaffins such as 1-chloro-1-nitro-propane, 1-bromo-1-nitro-ethane, 1-iodo-2-nitro-butane, 2-nitro-2,3-dichloro-butane and the like, the liquid hydroxy substituted nitro-paraffins such as 2-hydroxy-1-nitro-propane, 1-hydroxy-2-nitro-2-chloro-butane and the like and other liquid nitroparaffin derivatives containing other substituent groups such as alkoxy groups, acyl groups, cyano groups, nitroso groups, keto groups etc. The preferred solvents are liquids having the structure $R-NO_2$ where $R$ is a saturated aliphatic nucleus containing from 1 to 6 carbon atoms, since such compounds ordinarily possess the desired volatility. Compounds of the above structure wherein $R$ is an alkyl group or a halogen or hydroxyl substituted alkyl group containing from 1 to 6 carbon atoms are cheaper and more readily available and will usually be employed.

As mentioned hereinabove the solvents of this invention are employed to dissolve copolymers of butadiene-1,3 hydrocarbons and alpha methylene nitriles. Although copolymers of butadiene-1,3 and acrylonitrile are now commercially available and will ordinarily be used, other copolymers prepared from any of the butadiene-1,3 hydrocarbons including, in addition to butadiene-1,3, its homologs such as isoprene, 2,3-dimethyl butadiene-1,3, piperylene, etc., and any of the alpha methylene nitriles such as acrylonitrile, alpha-methyl acrylonitrile, alpha-ethyl acrylonitrile, alpha-propyl acrylonitrile, alpha-chloroethyl acrylonitrile, etc., may also be employed. Substances prepared by the copolymerization of a mixture of several polymerizable materials one of which is a butadiene-1,3 hydrocarbon and another of which is an alpha methylene nitrile are also soluble in the solvents of this invention. Even though polymeric materials often vary in solubility depending upon the method used in preparing them, the solvents of this invention dissolve the copolymers mentioned above regardless of whether such copolymers are prepared by emulsion polymerization, heat polymerization or by any other method. Emulsion prepared copolymers, however, are more soluble.

When practicing this invention by dissolving a copolymer of a butadiene hydrocarbon and an alpha methylene nitrile in one of the above mentioned solvents, the exact nature and proportions of materials used will obviously depend upon the type of liquid composition desired and upon the use to be made of the compositions. In general the recipes and methods of mixing employed will be analogous to those used in preparing cements or coating compositions containing natural or synthetic rubber dissolved in other solvents. Thus the synthetic rubber, or copolymer, base may be an uncompounded stock or it may be a compound containing the synthetic rubber mixed with other materials such as natural rubber, softeners, pigments, fillers, antioxidants, accelerators, vulcanizing agents, etc. On the other hand the solvent may consist solely of a nitroparaffin or nitroparaffin derivative or a mixture of these or it may contain other solvents such as ethylene dichloride, benzene, toluene, chlorobenzene, "Solvesso No. 1," a commercially available aromatic type solvent, acetone, methyl ethyl ketone, ethyl acetate or the like mixed therewith. The proportion of the synthetic rubber or synthetic rubber compound dissolved in the solvent or solvent mixture may be as little as 1% by weight, when very dilute solutions are required, or as high as 50% by weight or even higher when thick semi-liquid spreading compounds are the desired product.

To illustrate this invention a 10 gram sample of a crude uncompounded synthetic rubber prepared by copolymerizing in aqueous emulsion 75 parts by weight of butadiene-1,3 and 25 parts by weight of acrylonitrile is added to 100 grams of nitroethane and the solvent is agitated until the synthetic rubber dissolves. Solution takes place in the same length of time required when ethylene dichloride, an excellent solvent but a very toxic substance, is employed as the solvent. This solution may be kept indefinitely without gelling while similar solutions made using other solvents gel appreciably after a few hours time. When the solution is brushed on a surface the solvent evaporates rapidly leaving a clear film of the copolymer.

When the concentration of the synthetic rubber in the solvent is increased to 20% by weight or higher, solutions which are somewhat more viscous but which still show no tendency to gel are obtained. Solutions of this concentration made using methyl ethyl ketone, benzene, chlorobenzene, "Solvesso No. 1," ethyl acetate and a number of other common solvents gel so quickly that their use is very limited, but it has been found that by replacing a portion of such a solvent with one of the nitroparaffin solvents of this invention, solutions which do not gel are produced. For example, a cement made up by dissolving 20 grams of a copolymer, prepared by copolymerizing in aqueous emulsion 55 parts of butadiene and 45 parts of acrylonitrile in a solvent mixture consisting of 50 grams of 1-chloro-1-nitro-propane and 50 grams of chlorobenzene does not gel at ordinary temperatures when kept for a long period of time.

As another example, a very concentrated cement is prepared by dissolving 2½ lbs. of a composition containing 100 parts by weight of a 55:45 emulsion copolymer of butadiene and acrylonitrile, 50 parts by weight of channel black and 50 parts by weight of a softener for the copolymer, in 1 gallon of a solvent mixture consisting of 75% by volume of "Solvesso No. 1" and only 25% by volume of nitro-ethane. Although cements of this concentration prepared without using nitro-ethane in the solvent mixture gel quite rapidly, this cement shows no tendency to gel even after standing for over a month.

In the above example the synthetic rubber is used in the compounded form rather than as the crude material. As another example of a solution containing such a compounded stock a synthetic rubber prepared by copolymerizing in aqueous emulsion 55 parts by weight of butadiene-1,3 and 45 parts by weight of acrylonitrile is compounded in the following recipe:

| | Parts by weight |
|---|---|
| Butadiene-acrylonitrile copolymer | 100.0 |
| Channel black | 50.0 |
| Zinc oxide | 5.0 |
| Soft coal tar | 25.0 |
| Dibutyl phthalate | 25.0 |
| Phenyl-beta-naphthylamine | 1.0 |
| Stearic acid | 1.0 |
| Sulfur | 2.0 |
| Benzothiazyl disulfide | 2.0 |
| | 211.0 |

A 160 gram sample of this compound is then dissolved in one quart of 1-nitro-butane. An excellent smooth cement which is useful in coating fabrics and in a number of other applications is obtained.

A solution containing vulcanizing agents like the one prepared above may be applied to a surface and heated to drive off the solvent and simultaneously vulcanize the copolymer or it may be allowed to dry without heating, vulcanization occurring slowly after the composition is applied to the surface. Compositions containing no sulfur or accelerator which do not vulcanize at all, as well as compositions designed to cure rapidly may also, of course, be prepared by appropriately selecting the various ingredients.

Adhesive compositions useful in adhering rubbery materials to each other or to porous or metallic surfaces may also be prepared by dissolving a butadiene acrylonitrile copolymer containing a sufficient amount of tackifying softeners in a nitro-paraffin solvent. Such oil-resistant adhesive solutions are useful in many applications which, however, form no part of the present invention.

The specific examples are to be regarded as merely illustrative of the invention, and not in any sense restrictive. It will be obvious to those skilled in the art that many modifications such as substituting equivalent materials and varying the proportions of materials used are within the spirit and scope of the invention as defined in the appended claims.

I claim:

1. A synthetic rubber cement comprising from 1 to 50% by weight of a copolymer of butadiene-1,3 with a lesser amount of acrylonitrile as the synthetic rubber constituent, and a liquid nitroparaffin of the formula R—NO$_2$ wherein R is an alkyl radical containing from 1 to 6 carbon atoms as a solvent for the said copolymer, the said nitroparaffin being present in a concentration sufficient to dissolve all the said copolymer present to form a liquid free-flowing solution without benefit of the action of any other solvent, and the said cement being characterized by substantial freedom from the formation of reversible gels on prolonged standing.

2. A synthetic rubber cement comprising from 1 to 50% by weight of a copolymer of about 55 parts of butadiene-1,3 and 45 parts of acrylonitrile as the synthetic rubber constituent, and a liquid nitroparaffin of the formula R—NO$_2$ wherein R is an alkyl group containing from 1 to 6 carbon atoms as a solvent for the said copolymer, the said nitroparaffin being present in a concentration sufficient to dissolve all the said copolymer present to form a liquid free-flowing solution without benefit of the action of any other solvent, and the said cement being characterized by substantial freedom from the formation of reversible gels on prolonged standing.

3. A synthetic rubber cement comprising from 1 to 50% by weight of a copolymer of butadiene-1,3 with a lesser amount of acrylonitrile as the synthetic rubber constituent, and a nitrobutane as a solvent for the said copolymer, the nitrobutane being present in a concentration sufficient to dissolve all the said copolymer present to form a liquid free-flowing solution without benefit of the action of any other solvent, and the said cement being characterized by substantial freedom from the formation of reversible gels on prolonged standing.

4. A synthetic rubber cement comprising about 10% by weight of a copolymer of about 55 parts of butadiene-1,3 and about 45 parts of acrylonitrile, and a sufficient amount of a nitrobutane to dissolve all the said copolymer to form a liquid-free flowing solution without benefit of the action of any other solvent, the said cement being characterized by substantial freedom from the formation of reversible gels on prolonged standing.

5. A synthetic rubber cement comprising from 1 to 50% by weight of a copolymer of about 55 parts of butadiene-1,3 and about 45 parts of acrylonitrile dissolved in a solvent consisting solely of liquid nitroparaffins of the formula $R-NO_2$ wherein R is an alkyl group containing from 1 to 6 carbon atoms, the said cement being characterized by substantial freedom from the formation of reversible gels on prolonged standing.

6. A synthetic rubber cement comprising about 10% by weight of a copolymer of about 75 parts of butadiene-1,3 and about 25 parts of acrylonitrile and a sufficient amount of nitroethane to dissolve all the said copolymer to form a liquid free-flowing solution without benefit of the action of any other solvent, the said cement being characterized by substantial freedom from the formation of reversible gels on prolonged standing.

BENJAMIN S. GARVEY.